June 6, 1961 J. N. A. HAWKINS 2,987,700
DIFFERENTIALLY SENSITIVE SONIC DETECTOR
Filed Sept. 2, 1943
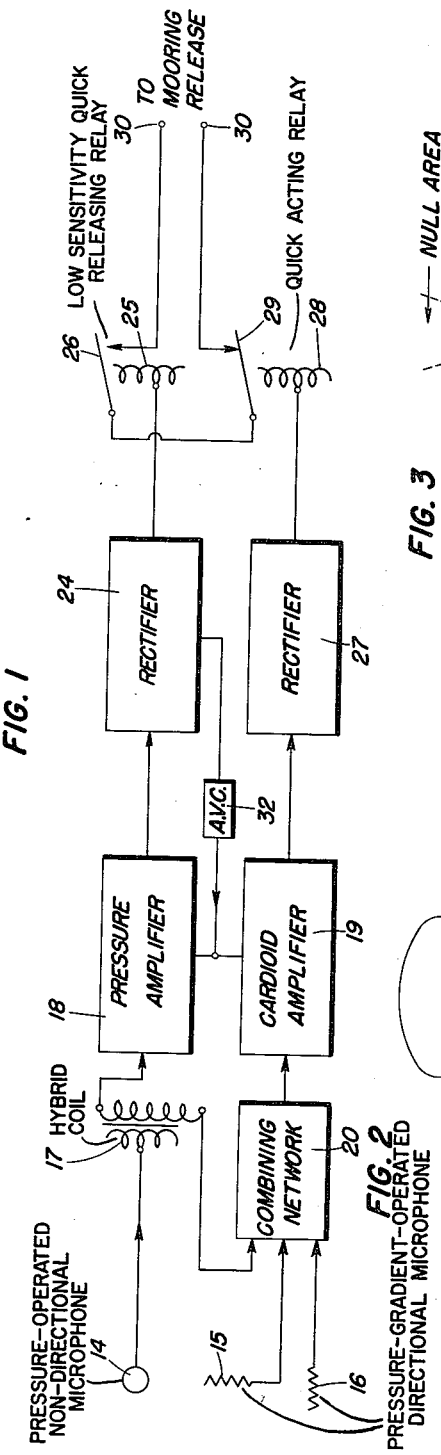
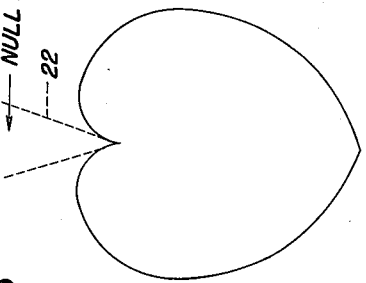
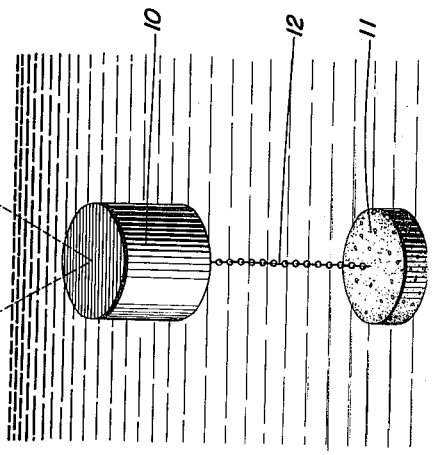
INVENTOR
JOHN N. A. HAWKINS
BY
ATTORNEY

2,987,700
DIFFERENTIALLY SENSITIVE SONIC DETECTOR

John N. A. Hawkins, Norfolk, Va., assignor to the United States of America as represented by the Secretary of the Navy Filed Sept. 2, 1943, Ser. No. 500,999
3 Claims. (Cl. 340—6)

This invention relates to sonic detectors and more particularly to a novel differentially sensitive sonic detector which is of simple form and is accurate and reliable in operation. The new detector is particularly adapted for use in mines, and the like, for controlling a release or detonating mechanism, although it will be understood that the invention may be used in other forms of apparatus.

Sonic detectors for mines have been proposed heretofore in which a single directional hydrophone has a response pattern extending upwardly over the mine. Detectors of this type have the disadvantage that loud sounds produced at a distance cause the same response as a weak sound signal originating within the cone of directivity. Thus, the detector cannot be made to operate on both strong and weak propeller sounds, even if a microphone could be obtained which is sufficiently directive at the low frequencies encountered. With a detector of this type, a ship can protect itself from the mine by radiating a strong sound signal, many times louder than normal propeller noise, somewhere in the frequency spectrum to which the detector is sensitive.

One object of the present invention, therefore, resides in the provision of a novel sonic detector adapted for use in mines and which overcomes the above-mentioned disadvantage of prior detectors of this type. The new detector is not affected by the defensive measure of radiating a strong sound signal from the ship, and there is no present method of protecting against it.

Another object of the invention is to provide a novel sonic detector which utilizes the principle of differential directivity and employs the "null" rather than the "maximum response" method of obtaining directivity.

A further object of the invention is to provide a novel sonic detector for use in mines, which includes a pressure operated microphone and a pair of directional, pressure-gradient operated microphones having a cardioid response pattern. In its preferred form, the detector includes an actuating device controlled jointly by the pressure and the pressure-gradient microphones, so that the actuating device is prepared for operation by the action on the three microphones of sound waves from an approaching object and is finally operated from the pressure-gradient microphones when the object enters the null area of the cardioid response pattern.

Still another object of the invention is to provide a novel differentially sensitive sonic detector which is characterized by its simplicity.

These and other objects of the invention may be better understood by reference to the accompanying drawing, in which FIG. 1 is a block diagram of one form of the new sonic detector;

FIG. 2 is a perspective view of a mine embodying the detector, and

FIG. 3 is a diagrammatic view of the directivity pattern of the microphones in a vertical plane.

For illustrative purposes, I have shown the invention in a form suitable for use in a mine. The mine may be of the type commonly used with a magnetic detection system and, as shown, comprises a metal cylinder 10 containing the explosive charge and the detector, the cylinder being connected to a concrete mooring anchor 11 by a cable 12. A mooring release mechanism (not shown) in the cylinder 10 is adapted to be actuated by the detector, to be described presently, with the result that the mine is released and its buoyancy causes it to rise toward the surface. A pressure-actuated, depth-sensitive device (not shown) in the cylinder 10 fires the explosive charge when the mine reaches a predetermined level.

The sonic detector of my invention comprises a pressure-operated microphone 14, which is nondirectional, and a pair of pressure-gradient operated microphones 15 and 16 having a high degree of directivity. The microphones may be mounted in any desired manner in the top portion of the mine cylinder 10. The pressure microphone 14 feeds a hybrid coil 17, the secondary winding of which is connected to a pressure signal amplifier 18. A cardioid signal amplifier 19 is coupled through a combining network 20 to the pressure-gradient microphones 15, 16 and to the secondary winding of the hybrid coil 17.

The detector employs the outphasing system commonly found in cardioid unidirectional microphones (Bell Laboratory Record, July 1939), wherein a directive null in the microphone response is obtained by combining the outputs of pressure and pressure-gradient microphones with proper regard for phase and amplitude over the required frequency band. The combining network 20 is operable to correct the phase relationship and amplitude of the signals from the pressure microphone 14 and the pressure-gradient microphones 15 and 16 with such regard for phase and amplitude over the ship's noise spectrum that a typical cardioid response pattern (FIG. 3) having a null area 22 is maintained over the mine. While the null area 22 is necessary to the operation of the invention, it will be understood that this area need not be an absolute null, since a response drop of ten decibels, for example, in the null area is sufficient for operation. It will be readily understood that it is not absolutely necessary to use two directional pressure-gradient microphones as one of these microphones whose output is correctly combined with that of one nondirectional pressure operated microphone will also produce a cardioid response pattern as indicated in FIGURE 3.

The pressure signal amplifier 18 receives signals only from the pressure microphone 14 and feeds them through a rectifier 24 to a D.C. relay having an operating coil 25 and a normally open switch 26. The coil 17 prevents signals in the pressure-gradient microphones 15, 16 from reaching the input of pressure signal amplifier 18. The cardioid signal amplifier 19 amplifies the signals from both the pressure-gradient microphones 15, 16 and the pressure microphone 14 and feeds them through a rectifier 27 to a D.C. relay having an operating coil 28 and a normally closed switch 29. The switches 26 and 29 are connected in series across a pair of terminals 30 which are included in an operating circuit for the mooring release mechanism (not shown). When the switches 26 and 29 are closed simultaneously, the mooring release mechanism is actuated and the mine 10 floats toward the surface until it is detonated at a predetermined level by the depth-sensitive device.

An automatic volume control 32 is preferably included in the detector system. The control 32, as shown, is fed from the rectifier 24 coupled to the pressure microphone 14, but it serves to control both the pressure signal amplifier 18 and the cardioid signal amplifier 19. Accordingly, by the use of the automatic volume control 32, the same directivity is provided on both strong and weak signals.

The operation of the detector is as follows: As a ship approaches, sound waves therefrom impinge upon all three of the microphones 14, 15 and 16, and the signals from the microphones are fed to both the pressure signal amplifier 18 and the cardioid signal amplifier 19. The gain of the cardioid signal amplifier 19 is adjusted so that it is always higher than the gain of the pressure signal amplifier 18, and, accordingly, the relay 28, 29, is first operated and opens the normally closed switch 29. As the ship continues to approach, the relay 25, 26 is operated by the signal from microphone 14 and closes its switch 26.

If the ship subsequently enters the null zone or "cone of silence" 22 above the mine, the relay 25, 26 is not affected, because the pressure microphone 14 is non-directional. However, the cardioid combination of pressure-gradient microphones 15, 16 has a high degree of directivity, and as the ship enters the null area 22, the signal intensity in the cardioid signal amplifier 19 decreases so that relay 28, 29 returns to its normally closed or non-operated position. As a result, the mooring release circuit is closed through terminals 30 so as to release the mine 10, which floats upwardly and is detonated.

In the event that the ship does not enter the null area 22 after both of the relays 25, 26 and 28, 29 have been initially actuated, that is, after switch 26 is closed and switch 29 is opened, the relay 25, 26 is the first to relax (because of its lower sensitivity) and is followed, as the signal grows weaker, by relaxation of relay 28, 29. At no time are both relay switches 26 and 29 closed, and therefore, the mine is not released.

The automatic volume control circuit 32 is provided so that ships of widely differing sound-generating capabilities will all operate the detector. The detector operates by reason of the percentage difference in sound level between a sound source inside and outside the null zone 22 and is not affected by the absolute level of the sound from the source. Thus, substantially the same measurable differentiation is present whether the source is a small motor-boat or a large liner. The automatic volume control 32 also insures satisfactory operation in areas where large amounts of ambient noise are present, such as might be produced by a convoy of ships. The automatic volume control 32 may be a simple circuit, since distorted sound signals have no effect on the detector, and no precautions need be taken to remedy the causes of such distortion.

In order to avoid false operation of the detector by gun fire, depth bombs or other sounds of a transient nature, the relay 25, 26 should have slow-operating characteristics, while the relay 28, 29 should be of the "slow-release" type. These characteristics may be accentuated by introducing long "charge" and "discharge" time constants in the rectifiers 24 and 27, respectively. The time constants should, of course, be greater than the time constant of the automatic volume control circuit.

The amplifiers 18 and 19 are preferably battery-operated, which has the advantage of automatically rendering the mine inoperative after a time determined by the life of the batteries. If desired, a secret means may be provided for acoustically actuating the mooring release gear from a distance by the use of a complex signal, whereby it is possible to clean out an area previously mined. Since the mine cannot be swept or artificially fired, except as noted above, it may be used in accordance with provisions of international law.

I claim:
1. A differentially sensitive sonic detector comprising an operating circuit, a normally open switch in said circuit, a normally closed switch in said circuit, a pressure-operated microphone, a pair of directional, pressure-gradient operated microphones, a pressure signal amplifier for amplifying signals from the pressure microphone, a cardioid signal amplifier for amplifying signals from said pressure microphone and from said pressure-gradient microphones, said cardioid signal amplifier having a higher gain than the pressure signal amplifier, a combining network coupled between the input end of the cardioid signal amplifier and said pressure and pressure-gradient microphones and operable to correct the phase relationship and amplitude of the signals from said microphones to maintain a cardioid response pattern for the microphones having a directive null, actuating means coupled to the output end of the cardioid signal amplifier for opening said second switch in response to approach of an object, and actuating means coupled to the output end of the pressure signal amplifier for subsequently closing said first switch upon approach of said object, said first actuating means being operable under control of the cardioid signal amplifier to cause closing of the second switch upon movement of said object into the null zone of said response pattern.

2. In a mine, a sonic detector comprising an operating circuit, a normally open switch in said circuit, a normally closed switch in said circuit, a pressure-operated microphone, a pair of directional, pressure-gradient operated microphones, a pressure signal amplifier for amplifying signals from the pressure microphone, a cardioid signal amplifier for amplifying signals from said pressure microphone and from said pressure-gradient microphones, said cardioid signal amplifier having a higher gain than the pressure signal amplifier, a combining network coupled between the input end of the cardioid signal amplifier and said pressure and pressure-gradient microphones and operable to correct the phase relationship and amplitude of the signals from said microphones to maintain a cardioid response pattern for the microphones having a directive null, actuating means coupled to the output end of the cardioid signal amplifier for opening said second switch in response to approach of an object, actuating means coupled to the output end of the pressure signal amplifier for subsequently closing said first switch upon approach of said object, said first actuating means being operable under control of the cardioid signal amplifier to cause closing of the second switch upon movement of said object into the null zone of said response pattern, and an automatic volume control for said amplifiers and fed from the output end of the pressure signal amplifier.

3. In a mine, a sonic detector comprising an operating circuit, a slow-operating relay having a normally open switch in said circuit, a slow-release relay having a normally closed switch in said circut, a pressure-operated microphone, a pair of directional, pressure-gradient operated microphones, a pressure signal amplifier for amplifying signals from the pressure microphone, a cardioid signal amplifier for amplifying signals from said pressure microphone and from said pressure-gradient microphones, said cardioid signal amplifier having a higher gain than the pressure signal amplifier, a combining network coupled between the input end of the cardioid signal amplifier and said pressure and pressure-gradient microphones and operable to correct the phase relationship and amplitude of the signals from said microphones to maintain a cardioid response pattern for the microphones having a directive null, means for coupling said second relay to the output end of the cardioid signal amplifier for opening said second switch in response to approach of an object, and means for coupling said first relay to the output end of the pressure signal amplifier for subsequently closing said first switch upon approach of said object, said second relay being operable under control of the cardioid signal amplifier to close said second switch upon movement of the object into the null zone of said cardioid response pattern.

References Cited in the file of this patent
UNITED STATES PATENTS

| | | |
|---|---|---|
| 1,310,568 | Heap et al. | July 22, 1919 |
| 2,100,206 | Stephens | Nov. 23, 1937 |
| 2,173,219 | Anderson | Sept. 19, 1939 |
| 2,417,927 | Giannini | Mar. 25, 1947 |

FOREIGN PATENTS

| | | |
|---|---|---|
| 542,483 | Germany | Jan. 25, 1932 |